O. J. HUMPHREY.
PNEUMATIC TIRE TUBE.
APPLICATION FILED OCT. 25, 1919.
1,417,383.
Patented May 23, 1922.
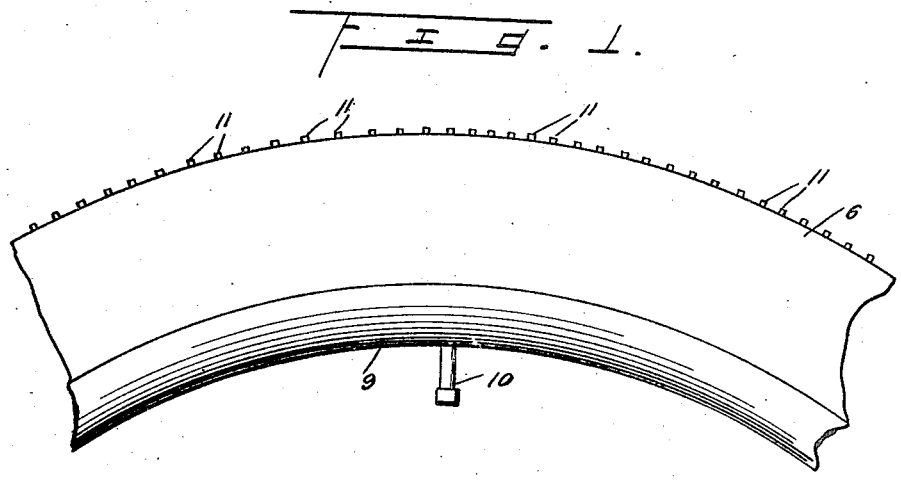
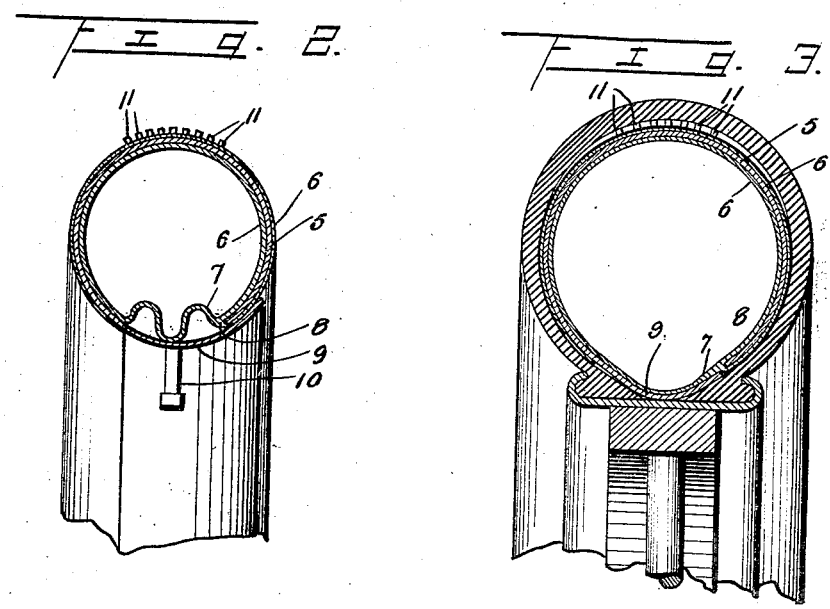
Inventor
O. J. Humphrey
By *[signature]*,
Attorney.

UNITED STATES PATENT OFFICE.

ORSON J. HUMPHREY, OF ELYRIA, OHIO.

PNEUMATIC-TIRE TUBE.

1,417,383.   Specification of Letters Patent.   Patented May 23, 1922.

Application filed October 25, 1919. Serial No. 333,259.

*To all whom it may concern:*

Be it known that I, ORSON J. HUMPHREY, a citizen of the United States, residing at Elyria, in the county of Lorain and State of Ohio, have invented certain new and useful Improvements in Pneumatic-Tire Tubes; and I do hereby declare the following to be a full, clear, and exact description of the invention, such as will enable others skilled in the art to which it appertains to make and use the same.

My invention relates to pneumatic tire tubes, its principal object being to provide an inner tube which will obviate punctures, blowouts and other tire trouble and which at the same time possesses the usual resilient qualities.

A further object of the invention is to provide a reinforced pneumatic tube which is formed from a sheet of relatively stout material such as canvas impregnated with rubber to render it air tight, the longitudinal edges of the latter being connected through the medium of an elastic strip to permit the tube to expand, the elastic strip being disposed in such a manner as to be prevented from becoming injured.

Still another object of the invention is to provide a pneumatic tube now in use and which will not creep within the tube.

Another object of the invention is to provide a pneumatic tire which is simple in construction, consists of few parts, and which may be manufactured and sold at a comparatively low cost.

With the above and other objects in mind, the invention consists in the novel combination of elements, construction and arrangement, and specific features all of which will be hereinafter enlarged upon and explicity defined in the appended claim.

On the drawings:

Figure 1 is a fragmentary side elevation of the tire tube constructed in accordance with my invention;

Figure 2 is a transverse sectional view of the same; and

Figure 3 is a transverse sectional view of the conventional tire tube and showing the tube accommodated therein in inflated condition.

Referring to the drawing wherein like characters of reference designate like parts in all the views the numeral 5 designates a sheet of fabric such as canvas or any other stout material of sufficient strength to prevent sharp objects penetrating the same. The sheet 5 is impregnated with rubber designated at 6 to render the sheet air tight. The impregnated sheet is rolled in tubular formation and secured to one of its longitudinal edges is a longitudinal elastic strip 7. This strip 7 is provided with longitudinal corrugations and is adapted to lie within the tire shoe as illustrated in Figure 2 and has its opposite longitudinal edge secured to the inner face of the sheet as indicated at 8 at a point remote from the free longitudinal edge of the tube. By attaching this edge of the strip to the tube as illustrated, a flap 9 is afforded which overlies the elastic strip and protects the same when the tube is in position in the tire casing. As illustrated in Figure 3 the elastic strip 8 permits the tube to conform to the contour of the casing designated when inflated. The usual inflating valve is designated at 10 and is mounted on the elastic strip 7. In order to retain the tube against creeping within the shoe or casing, the crest of the tube is formed with vacuum projections or cups 11 that contact with the inner face of the tire casing.

The structure shown and described is a practical embodiment of the invention but it will be understood that the same may be embodied in other constructions, and that my limits of such embodiments are governed by what is claimed.

What is claimed is:

A tire tube structure having continuous reinforcing material impregnated with rubber, continuous elastic means vulcanized to said rubber including a portion bridging spaced portions of said material, a continuous protecting flap extending from, free and beyond one of said portions to cover the bridging portion of the elastic means, and means extending from the exterior of said material to engage the inner wall of a shoe to prevent creeping.

In testimony whereof I affix my signature in presence of two witnesses.

ORSON J. HUMPHREY.

Witnesses:
GEO. W. CHAMBERLAIN,
L. D. HAMLIN.